Dec. 11, 1928.

G. E. BARNHART

ROOM HEATER

Filed May 11, 1927

1,695,079

INVENTOR.
GEORGE E. BARNHART
BY A.B. Bowman
ATTORNEY

Patented Dec. 11, 1928.

1,695,079

UNITED STATES PATENT OFFICE.

GEORGE E. BARNHART, OF LOS ANGELES, CALIFORNIA.

ROOM HEATER.

Application filed May 11, 1927. Serial No. 190,619.

My invention relates to room heaters, and the objects of my invention are: first, to provide a novelly constructed heating core for utilizing the greatest amount of heat possible for indirectly heating air for heating purposes; second, to provide a heating core for heaters of this class whereby the gases of combustion from a burner are forced to take a circuitous path from one end of a shallow casing to the other and in which the gases of combustion are substantially pocketed and forced downwardly by inclined baffles; third, to provide a heating core in which the side walls thereof are heated to a high temperature by a minimum of baffle construction within the core; fourth, to provide novelly constructed baffles and a novel arrangement of the baffles relative to the side walls of the core; fifth, to provide a heater of this class in which a large heated area is exposed to air passing through the heater; sixth, to provide a heater of this class which may be positioned on the floor of a room, supported on the side wall thereof, or built into the wall, if desired; seventh, to provide, as a whole, a novelly constructed heater for heating rooms; and, eighth, to provide a heater of this class which is particularly simple and economical of construction, durable, efficient and which will not readily deteriorate.

Figure 2:
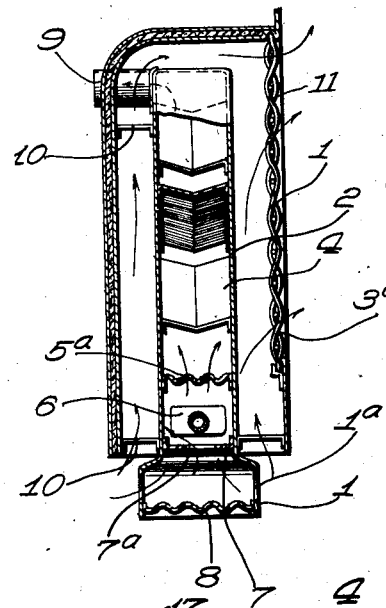
Figure 1:
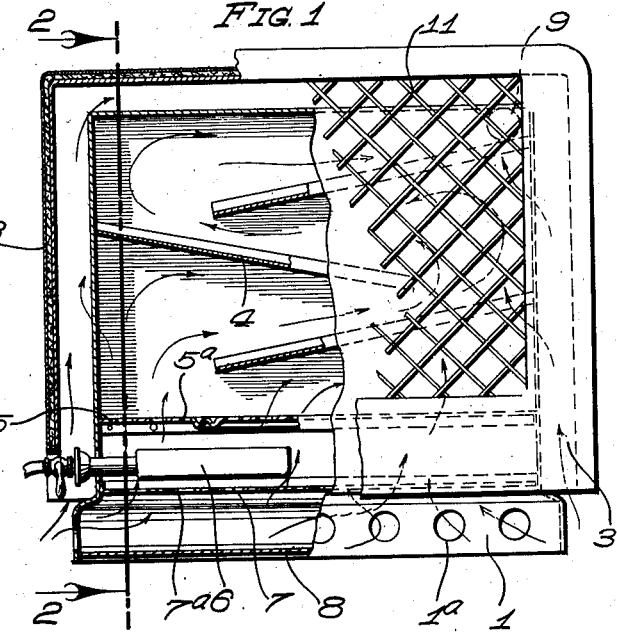
Figure 4:
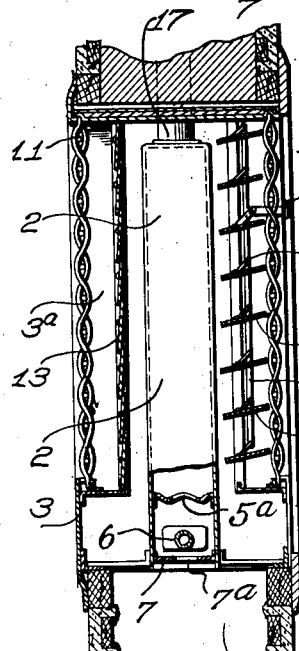
Figure 3:
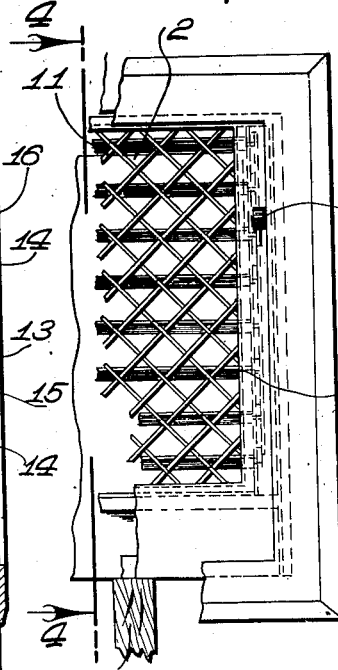
Figure 5:
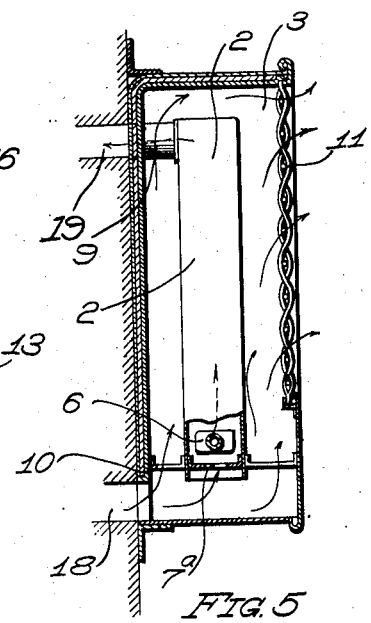

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a front elevational view of my heater in one form of construction, showing certain parts and portions thereof broken away and in section to facilitate the illustration; Fig. 2 is a sectional elevational view thereof taken through 2—2 of Fig. 1; Fig. 3 is a fragmentary front elevational view of my heater in a slightly modified form of construction; Fig. 4 is a sectional elevational view thereof taken through 4—4 of Fig. 3; and, Fig. 5 is a sectional elevational view of my heater in another slightly modified form of construction, showing the same supported on a wall.

Like characters of reference refer to similar parts and portions throughout the several views of the drawings.

The heater, shown in Figs. 1 and 2, is adapted to be used for heating rooms and is adapted to be moved about in the room, as desired. This heater is supported on a base 1 which forms the lower portion of the heating core casing 2. Around the casing 2 is positioned the enclosing casing or housing 3 for directing the air against and around the heating core.

The casing 2 of the core is relatively wide and high, but very shallow, that is, of little depth from front to rear. At the upper or air heating portion of the casing 2, are provided baffles 4 which extend inwardly from the opposite narrow end walls toward the opposite end walls in staggered relation relative to the adjacent baffles, and are spaced at their inner ends from said opposite end walls. Said baffles are also inclined downwardly from the end wall of the casing 2 with which they are connected, thus substantially creating pockets at the under sides of the baffles near the portions secured to the end walls. Thus, the hot gases of combustion from the burner pass through the heating core in a circuitous path and into and out of the pockets, it being noted, however, that any gases pocketed within the core are only those of high temperature. The cross section of the baffles are substantially channel shaped, as shown best in Fig. 2, essentially for two reasons, namely, to permit expansion of the baffles transversely without distorting the outer walls and also to direct the gases impinging against the lower sides of the baffles against the side walls of the casing. Positioned below and spaced from the lower end of the lower baffle, is a heat distributing baffle 5 which extends preferably the full length of the core and is provided with perforations 5ª to permit the gases of combustion from the burner 6, positioned immediately below the same, to pass upwardly through the baffle along the whole of its length. The baffle 5 is also preferably corrugated longitudinally to prevent distortion from expansion and also to provide means for directing the hot gases toward the end of the burner at which the outer end of the lower baffle is connected. The burner 6 is preferably positioned at the one end of the core below the baffle 5 near which end the end of the lower baffle 4 terminates so that the greater portion of the heat is directed upwardly past the lower baffle 4. Below the burner 6 is provided a longitudinal partition 7 which extends the full length of the core and is provided with perforations 7ª for distributing air uniformly to the combustion chamber. The lower end of the base 1, which forms a part of the core, may also be provided with a partition 8, as shown. The sides and ends of the base 1 are preferably provided with perforations 1ª for admitting air to the combustion chamber through the partition 7. The burnt gases of combustion are discharged from the upper end of the heating core through a flue 9 which may be directed either upwardly or to the side, said flue 9 being connected with the casing 2 at the end thereof at which the upper end of the upper baffle terminates with the one end wall of the casing 2.

The casing or housing 3, which may consist of a sheet metal housing covered with asbestos and a thin outer covering of sheet metal, is spaced at all sides from the heating core and is supported relative thereto by spacers or brackets 10, it being noted that the outer housing 3 is spaced from the floor and, therefore, provides a large opening for the admission of the air to be heated. The air entering the housing 3 between the front side of the heating core and the front wall of the housing 3 impinges against the front side wall of the casing 2 and then passes into the room through the opening 3ª at the upper portion of the front side of the housing 3. The air entering the housing 3 at the ends passes upwardly and thence forwardly through the opening 3ª, while the air passing into the housing 3 at the back portion thereof, passes upwardly, impinging against the back wall of the casing 2, thence over the upper end of the latter and out through the opening 3ª. At the front side of the housing 3 over the opening 3ª, may be provided a screen or suitable grating 11, if desired.

The heater in the modified form of construction in Figs. 3 and 4 is built into a building wall. The base is omitted in this modification and the heating core casing 2, as well as the outer housing 3, supported directly on the wall and the settings 12 on the wall. The wall for this purpose is open, receiving air from below, preferably through the sill of the wall. In this modification, the outer housing 3 is preferably open at its opposite side, that is, if the rooms at the opposite sides of the wall are to be heated by the same heater. Within the heater, at the opposite sides of the core casing 2, are provided shutters 13. The shutters at each side are provided with arms 14 which are connected by a rod 15, one of the arms being provided with a control member 16 whereby all of the shutters at one side may be simultaneously actuated for either admitting air to the particular room or shutting off the air or heat. The vent 17 in this modification is preferably directed upwardly through the wall for directing the gases of combustion to the atmosphere.

In the modification shown in Fig. 5, the heater is supported in any suitable manner on the wall of the room to be heated. The heater for this purpose may be similar to that shown in Figs. 1 and 2 without the base, taking in the air directly from the room. The lower end, however, may be closed, as shown in Fig. 5, and air supplied thereto from the outside through a duct 18 which may pass upwardly through the wall, as in the structures illustrated in Figs. 3 and 4. In this modification, the burnt gases may be directed backwardly through the vent 9 into a flue 19 for directing the burnt gases of combustion to the atmosphere.

Though I have shown and described a particular construction, combination and arrangement of parts and portions, and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In a heating means of the class described, a heating core having a burner at its lower end and baffles at its upper portion, said baffles extending inwardly and downwardly from opposite side walls of the core and spaced at their inner ends from the opposite wall, said baffles being secured at their outer long edges to the inner side walls of the core, said baffles being provided with longitudinal channels to take up transverse expansion of the core.

2. In a heating means of the class described, a heating core having a burner at its lower end and baffles at its upper portion, said baffles extending inwardly and downwardly from opposite side walls of the core and spaced at their inner ends from the opposite wall, said baffles being channel shaped with the portions intermediate the edges lower than the edges whereby the hot gases from said burner are directed toward the side wall of the core.

3. In a heating means of the class described, a narrow heating casing, a burner positioned at the lower portion thereof, and baffles within the upper portion of said casing, said baffles extending inwardly and downwardly from the opposite end walls of the casing and secured at the edges to the side walls of the casing, the inner ends of said baffles being spaced from the opposite end walls of the casing, the cross sections of said baffles being channel shaped with the portions intermediate the side edges positioned lower than the edges whereby hot gases from said burner are directed toward the side walls of the heating casing.

4. In a heating means of the class described, a narrow heating casing, a burner positioned at the lower portion thereof, baffles within the upper portion of said casing, said baffles extending inwardly and downwardly from the opposite end walls of the casing and secured at the edges to the side walls of the casing, the inner ends of said baffles being spaced from the opposite end walls of the casing, and a heat distributing perforated baffle positioned immediately above the burner and extending between the end walls of the casing.

5. In a heating means of the class described, a narrow heating casing, a burner positioned at the lower portion thereof, baffles within the upper portion of said casing, said baffles extending inwardly and downwardly from the opposite end walls of the casing and secured at the edges to the side walls of the casing, the inner ends of said baffles being spaced from the opposite end walls of the casing, and a heat distributing perforated baffle positioned immediately above the burner and extending between the end walls of the casing, said burner being positioned at the one end of the casing below and beyond the inner end of the lowermost baffle.

6. In a heating means of the class described, a narrow heating casing, a burner positioned at the lower portion thereof, and baffles within the upper portion of said casing, said baffles extending inwardly and downwardly from the opposite end walls of the casing and secured at the edges to the side walls of the casing, the inner ends of said baffles being spaced from the opposite end walls of the casing, said burner being positioned at the one end of the casing below and beyond the inner end of the lowermost baffle.

7. In a heating means of the class described, a heating core having a burner at its lower end and baffles at its upper portion, said baffles extending inwardly and downwardly from opposite side walls of the core and spaced at their inner ends from the opposite wall, and an enclosing casing positioned around and spaced from said heating casing and open at one side, said enclosing casing being open at its lower portion for admitting air thereto, said enclosing casing being so positioned as to direct air around said heating core for heating air adapted to be discharged through the side opening of the enclosing casing.

8. In a heating means of the class described, a narrow heating casing, a burner positioned at the lower portion thereof, baffles within the upper portion of said casing, said baffles extending inwardly and downwardly from the opposite end walls of the casing and secured at the edges to the side walls of the casing, the inner ends of said baffles being spaced from the opposite end walls of the casing, and an enclosing casing positioned around and spaced from said heating casing and open at one side, said enclosing casing being open at its lower portion for admitting air thereto, said enclosing casing being so positioned as to direct air around the heating casing for heating air adapted to be discharged through the side opening of the enclosing casing.

In testimony whereof, I have hereunto set my hand at Pasadena, California this 22nd day of April, 1927.

GEORGE E. BARNHART.